(12) United States Patent
Hoyer et al.

(10) Patent No.: US 10,833,795 B2
(45) Date of Patent: Nov. 10, 2020

(54) SYSTEM, APPARATUS AND METHOD FOR OPTIMIZING CONFIGURATION OF A WIRELESS TRANSMITTER

(71) Applicant: Silicon Laboratories Inc., Austin, TX (US)

(72) Inventors: Hadrien Hoyer, Rennes (FR); David Le Goff, Rennes (FR)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/211,513

(22) Filed: Dec. 6, 2018

(65) Prior Publication Data

US 2020/0186276 A1     Jun. 11, 2020

(51) Int. Cl.
*H04L 1/00* (2006.01)
*H04W 52/28* (2009.01)
*H04L 27/26* (2006.01)
*G06F 9/30* (2018.01)

(52) U.S. Cl.
CPC ........ *H04L 1/0004* (2013.01); *H04L 27/2626* (2013.01); *H04W 52/286* (2013.01)

(58) Field of Classification Search
None
See application file for complete search history.

(56) References Cited

U.S. PATENT DOCUMENTS

| | | | |
|---|---|---|---|
| 6,823,181 B1 | 11/2004 | Kohno et al. | |
| 2005/0025254 A1* | 2/2005 | Awad | H04L 1/0003 375/295 |
| 2012/0320858 A1* | 12/2012 | Maru | H04L 1/0003 370/329 |
| 2015/0358050 A1* | 12/2015 | Lingam | H04B 3/544 375/257 |

OTHER PUBLICATIONS

Pierre Chevillat, et al., "Dynamic Data Rate and Transmit Power Adjustment in IEEE 802.11 Wireless LANs," International Journal of Wireless Information Networks, vol. 12, No. 3, Jul. 2005, 23 pages.
Silicon Labs, "Introducing the First Energy Efficient Wi-Fi Solution Designed Specifically for the IoT," copyright 2018, 5 pages.
U.S. Appl. No. 15/968,996, filed May 2, 2018, entitled "System, Apparatus and Method for Flexible Control of a Voltage Regulator of an Integrated Circuit," by Adrianus Bink, et al.

* cited by examiner

*Primary Examiner* — Yaotang Wang
(74) *Attorney, Agent, or Firm* — Trop, Pruner & Hu, P.C.

(57) ABSTRACT

In an embodiment, an apparatus includes: a modulator to modulate a first packet according to rate control information; a physical circuit to transmit the modulated first packet according to power control information; and a dynamic adaptation circuit, for the first packet, to provide the rate control information and the power control information of a first modulation and power pair stored in a first energy map.

15 Claims, 7 Drawing Sheets

SYSTEM, APPARATUS AND METHOD FOR OPTIMIZING CONFIGURATION OF A WIRELESS TRANSMITTER

BACKGROUND

One common wireless communication protocol is Wi-Fi, in accordance with an Institute of Electrical and Electronics Engineers (IEEE) 802.11 standard. Wi-Fi was not intended to be a low power protocol, and thus the integration of this technology into battery-powered products creates challenges to reduce energy consumption.

SUMMARY OF THE INVENTION

In one aspect, an apparatus includes: a modulator to modulate a first packet according to rate control information received from a dynamic adaptation circuit; a physical circuit to transmit the modulated first packet according to power control information received from the dynamic adaptation circuit; and the dynamic adaptation circuit, for the first packet, to provide the rate control information and the power control information of a first modulation and power pair stored in a first energy map, the first energy map including a plurality of modulation and power pairs, where one or more modulation and power pairs are associated with each of a plurality of robustness indices.

In an example, the first modulation and power pair comprises an optimal modulation and power pair of a first plurality of modulation and power pairs associated with a first robustness index of the plurality of robustness indices. The dynamic adaptation circuit may select the first robustness index based at least in part on quality feedback information from a receiver in communication with the apparatus. And the quality feedback information may be based on a plurality of acknowledgement messages received in the apparatus from the receiver for a plurality of packets.

When the quality feedback information is less than a first reliability threshold, the dynamic adaptation circuit is, for another packet, to provide the rate control information and the power control information of a different modulation and power pair stored in the first energy map, the another modulation and power pair associated with a higher robustness index. The dynamic adaptation circuit may access the first energy map to obtain the first modulation and power pair when a length of the first packet exceeds a length threshold. The dynamic adaptation circuit may, for a second packet, access a second energy map to obtain another modulation and power pair when a length of the second packet is less than the length threshold.

In an example, the apparatus further includes a non-volatile storage to store the first energy map, the first energy map based at least in part on energy consumption information for the plurality of modulation and power pairs. The dynamic adaptation circuit may, for a second packet, provide the rate control information and the power control information of a second modulation and power pair stored in the first energy map, where both the rate control information and the power control information of the modulation and power pair and the rate control information and the power control information of the second modulation and power pair differ. In response to a change in a robustness index, the dynamic adaptation circuit may provide the power control information and the rate control information of a second modulation and power pair stored in the first energy map having different values than corresponding values of a prior robustness index. The dynamic adaptation circuit may, for a second packet of a predetermined type, provide the rate control information having a first predetermined value and the power control information having a second predetermined value. The physical circuit may control a first gain of a first gain block and a second gain of a second gain block based at least in part on the power control information.

In another aspect, a method includes: in response to determining that quality feedback information received from a receiver in communication with the wireless transmitter exceeds a robustness threshold, concurrently updating a rate configuration for a modulator of the wireless transmitter and a power configuration for a physical circuit of the wireless transmitter; causing one or more packets to be transmitted from the wireless transmitter according to the updated rate configuration and the updated power configuration; after causing the one or more packets to be transmitted from the wireless transmitter according to the updated rate configuration and the updated power configuration, determining whether the quality feedback information exceeds the robustness threshold; and in response to determining that the quality feedback information exceeds the robustness threshold, concurrently updating the updated rate configuration for the modulator to a second updated rate configuration and updating the updated power configuration for the physical circuit to a second updated power configuration.

In an example, the method further includes identifying the updated rate configuration and the updated power configuration based at least in part on a length of the one or more packets. The method may further include accessing a non-volatile storage of the wireless transmitter to obtain the updated rate configuration and the updated power configuration. In an example, the second updated rate configuration and the second updated power configuration are associated with a lower robustness level than a robustness level associated with the updated rate configuration and the updated power configuration.

In another aspect, an internet of things (IoT) device includes a sensor to sense information and a wireless transceiver coupled to the sensor. The wireless transceiver may include: a modulator to modulate a first packet according to a modulation characteristic of a first modulation and power pair; at least one gain stage coupled to the modulator to apply gain to the modulated first packet according to a power characteristic of the first modulation and power pair; a power amplifier coupled to the at least one gain stage to transmit the modulated first packet according to the power characteristic of the first modulation and power pair; and a dynamic adaptation circuit, for the first packet, to identify the first modulation and power pair from a first plurality of modulation and power pairs stored in a first energy map and associated with a first robustness index, where the first modulation and power pair comprises an optimal modulation and power pair of the first plurality of modulation and power pairs.

In an example, the optimal modulation and power pair comprises a least power consumption level of the first plurality of modulation and power pairs. The dynamic adaptation circuit, for a second packet comprising a retransmission packet, may identify a second modulation and power pair having a highest power consumption level of the first plurality of modulation and power pairs. The dynamic adaptation circuit may select the first robustness index based at least in part on quality feedback information from a receiver in communication with the IoT device.

DETAILED DESCRIPTION

In various embodiments, a wireless transmitter may be controlled dynamically during operation to transmit information with dynamic modulation and power characteristics. More specifically, embodiments described herein provide a dynamic adaptation mechanism that dynamically determines an optimal modulation and power level based at least in part on feedback information regarding quality of received signals at a receiver to which the wireless transmitter is sending transmitted information. In this way, embodiments target transmission power of data frames over the air, thus reducing the overall consumption of a transmitter, with techniques that optimize energy usage per unit of data to transmit.

In embodiments, dynamic adaptation circuitry may dynamically control both modulation (e.g., in terms of a given rate) and power concurrently, such that transmission may occur at a combination of optimal modulation and power parameters. In this way, signal quality may be enhanced, potentially reducing the length of transmission time (e.g., due to fewer retransmission requirements) as well as reducing power consumption, particularly in implementations in which the wireless transmitter is included in a portable, battery-operated device or other device to operate at low power levels.

Figure 1:
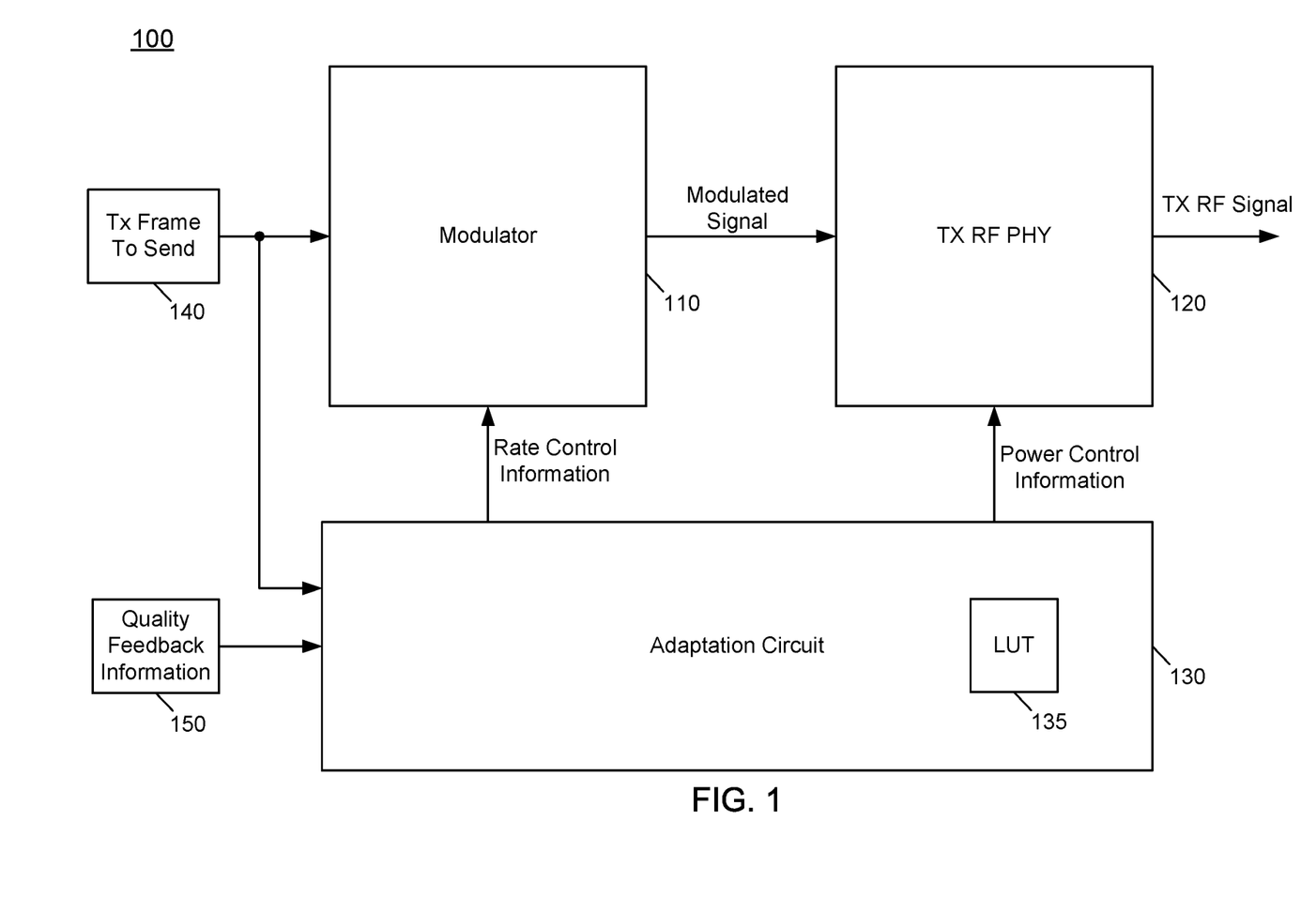
FIG. 1 is a block diagram of a high level view of a wireless transmitter in accordance with an embodiment.

Referring now to FIG. 1, shown is a block diagram of a high level view of a wireless transmitter in accordance with an embodiment. As shown in FIG. 1, transmitter 100 may be part of a given wireless device. In this particular embodiment, wireless transmitter 100 may be implemented on a single semiconductor die that may be a wireless integrated circuit including transceiver circuitry, to enable both transmission and reception of wireless signals. Although embodiments can vary, in the implementation of FIG. 1, wireless transmitter 100 may be a short-range wireless transceiver such as a so-called WiFi chip to communicate, e.g., in accordance with an IEEE 802.11 standard. Of course embodiments are not limited to WiFi communication and are applicable to a wide variety of short range and wide area wireless communications.

As illustrated in FIG. 1, a modulator 110 is present and is configured to receive transmission frames that are to be communicated. In various embodiments, transmission frames 140 may be packet-based communications. The size of each packet may vary. Packet size may be a factor taken under consideration in performing the dynamic rate and power adaptation described herein. Modulator 110 applies a given modulation to transmission frames 140. More specifically, modulator 110 may modulate a frame, e.g., in accordance with a given WiFi-based modulation at a particular rate according to rate control information received from an adaptation circuit 130. Details of the operation of adaptation circuit 130 are described further below. Suffice to say, adaptation circuit 130 may dynamically determine an appropriate rate for communication of one or more packets and send the rate control information to enable modulator 110 to modulate a given transmission frame according to the rate control information.

In turn, a modulated signal is provided from modulator 110 to a transmit radio frequency (RF) physical unit (PHY) 120. As illustrated, PHY 120 may output a RF transmission signal based on the modulated signal it receives. And will be described further herein, PHY 120 may communicate the signal at a given power level based on power control information received from adaptation circuit 130. In embodiments, transmitter 100 uses a set of modulations $M_k$ in [0, N] corresponding to certain net bitrate in Mbit/s. At a given transmission power $P_{tx}$, k=0 is the most robust and the most likely to successfully transmit a data payload, but it comes with the lowest bitrate. Each successive modulation is less robust but provides better throughput. The robustness of a modulation transmitted at a particular power level translates to a certain error rate at a receiver located at a certain distance, other things being equals. This location is called the Range R.

Let us define a modulation and power pair, ($M_k$, $P_i$), for modulation k used in conjunction with transmit power i. The span of i depends on the system, with a defined $P_{max}$ of maximum available power. Typical systems emphasize transmitting a payload as fast as possible, so they tend to use the highest throughput with maximum available power, no matter the energy cost. In other words, they use ($M_k$, $P_{max}$) and try to maximize k.

Embodiments instead may identify optimal pairs to accommodate a situation where maintaining continuously high peak data rate is not necessary but energy is a resource to conserve, such as in battery-powered IoT devices. In an embodiment note that with variables i and k, the energy consumption per transmitted bit is evaluated for ($M_{k-1}$, $P_i$), with i so that the range of the signal is equivalent to the one using ($M_k$, $P_{max}$). Energy wise, an optimum configuration having a modulation and power pair ($M_{opt}$, $P_{opt}$) can be selected among the multiple configurations sharing the same range. This will ensure reduced energy per bit ratio at the cost of reduced instantaneous bit rate.

With further reference to FIG. 1, note that adaptation circuit 130 receives frame information, e.g., in the form of actual frames 140 to be transmitted. In other cases, adaptation circuit 130 may simply receive certain information associated with corresponding frames, more particularly packet length information. In addition, adaptation circuit 130 also receives quality feedback information 150. In embodiments herein, this information may correspond to a given feedback metric that is received from a receiver with which transmitter 100 is in communication. In a particular embodiment, this feedback information may be in the form of acknowledgement messages received from the receiver that indicate that the receiver successfully received given packets. To track this information, transmitter 100 may include, for example, one or more counters (not shown in FIG. 1) that maintain a count of transmitted packets and a count of received acknowledgements. Based on one or more of these counts, adaptation circuit 130 can identify whether signals are being transmitted with sufficient robustness.

Still with reference to FIG. 1, note that adaptation circuit 130 includes a lookup table 135. As will be described herein, lookup table 135 may store a set of modulation and power couples or pairs. More particularly, there may be multiple modulation and power pairs associated with a given robustness level of a plurality of robustness levels, each identified by a corresponding robustness index. As will be described herein in cases where there are multiple modulation and power pairs for a given robustness level, one such couple may be identified as an optimal pair, and which may be selected and used to provide corresponding rate control information and power control information to modulator 110 and PHY 120, in certain instances. Understand while shown at this high level in the embodiment of FIG. 1, many variations and alternatives are possible.

Figure 2:
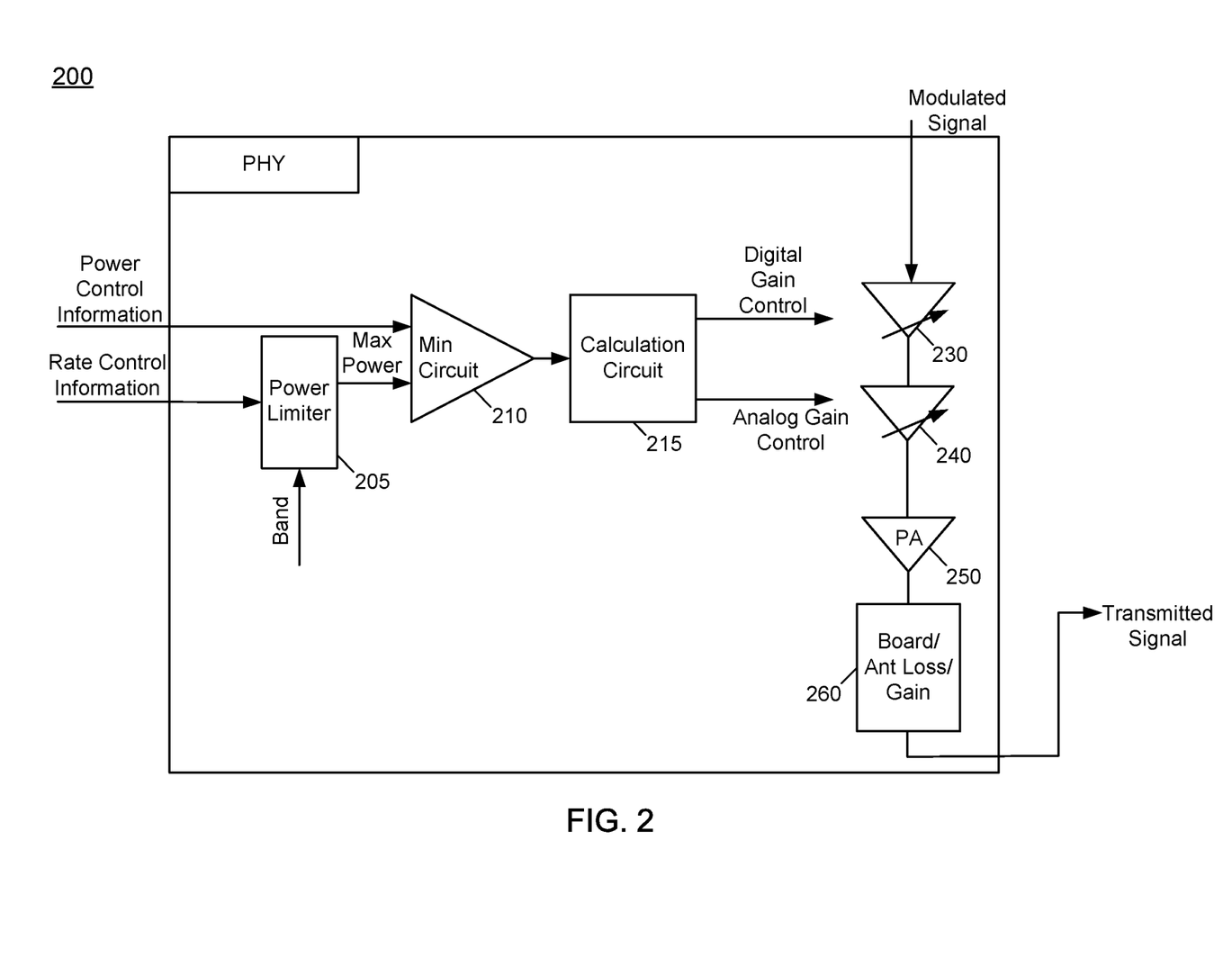
FIG. 2 is a block diagram of a representative physical unit circuit in accordance with an embodiment.

Referring now to FIG. 2, shown is a block diagram of a representative physical unit circuit in accordance with an embodiment. As shown in FIG. 2, PHY circuit 200 may correspond to PHY 120 of FIG. 1. As illustrated, PHY 200 receives modulation information (e.g., in the form of rate control information), along with power control information. The rate information is provided to a power limiter 205, which further is configured to receive band information to identify a band at which the device is operating. Based on this information, power limiter 205 may output a maximum power level, which corresponds to a maximum allowed power level for transmission. Note that this maximum power level may be based at least in part on regulatory body requirements for a given region in which the device is located, to prevent transmissions at higher than this specified ceiling level.

As illustrated, this maximum power level is provided to a minimum (MIN) circuit 210 that further receives the power control information, corresponding to a requested power level (as requested by an adaptation circuit). MIN circuit 210 may select the minimum of these two values as the appropriate output power level to be used. As seen, this output power level is provided to a calculation circuit 215. In an embodiment, calculation circuit 215 may be implemented as an open loop control circuit to control various gain stages based on this power level information. As shown, calculation circuit 215 may determine digital and analog gain control signals. These gain control signals may be provided to a digital gain circuit 230 (e.g., implemented as a programmable gain amplifier) and an analog gain circuit 240 which also may be implemented as a controllable amplifier. As seen, these gain stages receive the modulated signal, and apply the corresponding gain to the modulated signal that in turn is then provided to a power amplifier (PA) 250, where the signal is further amplified. As illustrated, additional gain or loss may be provided within another gain block 260 that represents board/antenna loss or gain, such as related to signal attenuation in the wiring or additional gain/loss from an external amplifier/attenuator adapted on the board. The resulting RF signal is thus output at a given transmit level. Understand while shown at this high level in the embodiment of FIG. 2, many variations and alternatives are possible.

As described above, dynamic rate adaptation in accordance with an embodiment may leverage stored information to identify modulation and power pairs, and more particularly to identify a given optimal modulation and power pair for a given robustness level.

Figure 3:
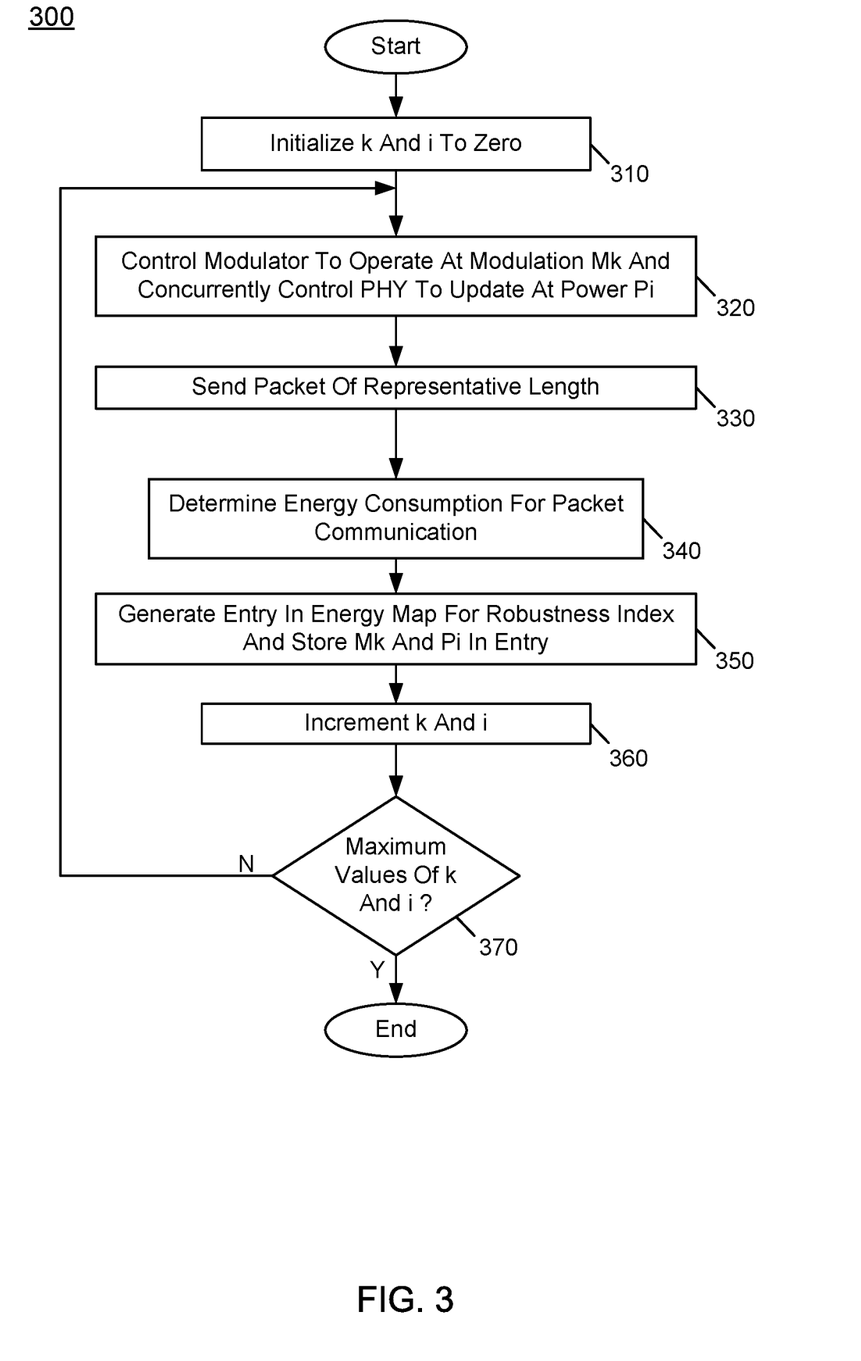
FIG. 3 is a flow diagram of a method in accordance with an embodiment.

Referring now to FIG. 3, shown is a flow diagram of a method in accordance with an embodiment. More specifically, method 300 in FIG. 3 is a method for generating modulation and power pairs for inclusion into a wireless transceiver in accordance with an embodiment. Method 300 may be performed during design time of a given wireless chip. For example, method 300 may be performed during design activities such as simulation activities, and/or during testing of a prototype chip to determine transmission characteristics. As illustrated, method 300 begins by initializing variables k and i to 0 (block 310). Note that these variables may be associated with a modulation index (namely k) and a power index (namely i). Control next passes to block 320 where a modulator of the wireless transceiver is controlled to operate at a modulation corresponding to a given modulation index $M_k$ and a PHY of the wireless transceiver is currently controlled to operate at a power level corresponding to a power index ($P_i$).

Thereafter, at block 330 packet of a representative length may be sent using these operating parameters (block 330). As an example, the representative length may correspond to a packet of a typical length, which may be on the order of approximately a few bytes to approximately 1500 bytes. Next, energy consumption of the transmitter associated with this packet transmission may be determined (block 340). For example, measurements may be made to determine this energy consumption, e.g., based on a measurement of current intensity from which the energy consumption can be directly calculated since every other parameter of the calculation is known beforehand. Then at block 350 an entry may be generated within an energy map for a given robustness index and the values of the control parameters for modulation indices $M_k$ and power indices $P_i$ may be stored within the entry. Next at block 360 the value of the variables k and i can be incremented. It is then determined whether these values have reached their maximum values (diamond 370). If not, control passes back to block 320 above. Otherwise the method concludes and the corresponding entries may be formed into an energy map having a plurality of entries each to store a modulation value and a power value for association with a given robustness index.

Referring now to Table 1, shown is a representative design table that may be generated during an operation as in method 300 to identify an energy estimate or measurement for each corresponding modulation and power pair. This process thus provides an estimation of the best energy per data unit ratios for variable channel conditions. Thus, embodiments can optimize power consumption while remaining dynamic to quickly react to degradation or improvements of the channel conditions.

As illustrated in Table 1 below, a given row is present for each of a plurality of robustness indices, each of which represents a robustness level. Within each row, corresponding energy measurements for different modulation levels are shown. As seen, for each row a given modulation level may correspond to an optimal configuration in terms of energy consumption, and which is highlighted by bold. In turn, each modulation level has a corresponding configuration to be used for certain packet types (and which is highlighted by italics), e.g., retransmissions (or acknowledgements or other short packets), more generally management packets that are sent to maintain the wireless network. Note that the blank items shown in Table 1 are configurations that cannot be attained by a given PHY. Also understand that the values, in units of Joules for a total of 32 Mbytes payload, shown in Table 1 are for example sake only and more or fewer modulation configurations, robustness indices and so forth may be present.

TABLE 1

| Mod 0 | Mod 1 | Mod 2 | Mod 3 | Mod 4 | Mod 5 | Mod 6 | Mod 7 |
|---|---|---|---|---|---|---|---|
| *19.11378* | | | | | | | |
| 16.29827 | | | | | | | |
| 14.61953 | | | | | | | |
| 13.45631 | *9.717005* | | | | | | |
| 12.50459 | 8.285662 | | | | | | |
| 11.69827 | 7.432232 | *6.584747* | | | | | |
| 11.06379 | 6.840879 | 5.614795 | | | | | |
| 10.6408 | 6.357045 | 5.036466 | | | | | |
| 10.01953 | 5.94713 | 4.635735 | *5.018618* | | | | |
| 8.142524 | 5.624574 | 4.307864 | 4.279361 | | | | |
| 7.693099 | 5.409536 | 4.030084 | 3.838583 | | | | |
| 7.349421 | 5.0937 | 3.811503 | 3.533162 | | | | |
| 7.085053 | 4.139471 | 3.665782 | 3.283273 | | | | |
| 6.820685 | 3.910994 | 3.451755 | 3.071561 | *3.419062* | | | |
| 6.609191 | 3.736276 | 2.80512 | 2.904968 | 2.9105 | | | |
| 6.384479 | 3.601878 | 2.650292 | 2.793905 | 2.609661 | | | |
| 6.225858 | 3.467479 | 2.531894 | 2.630783 | 2.401939 | | | |
| 6.054019 | 3.35996 | 2.440819 | 2.137945 | 2.234806 | | | |
| 5.935054 | 3.245722 | 2.349744 | 2.019942 | 2.091549 | *2.61035* | | |
| 5.842525 | 3.165083 | 2.276883 | 1.929704 | 1.979331 | 2.218982 | | |
| 5.72356 | 3.077724 | 2.199469 | 1.86029 | 1.905315 | 1.990068 | *2.328455* | |
| 5.657468 | 3.017244 | 2.144824 | 1.790876 | 1.795485 | 1.831306 | 1.975356 | |
| 5.604594 | 2.970205 | 2.085625 | 1.735345 | 1.454056 | 1.703927 | 1.770492 | *2.102231* |
| 5.485629 | 2.909726 | 2.044641 | 1.676343 | 1.375265 | 1.596855 | 1.630585 | 1.781268 |
| 5.419537 | 2.876126 | 2.012765 | 1.634695 | 1.315575 | 1.513781 | 1.518992 | 1.595688 |
| 5.366663 | 2.849246 | 1.971781 | 1.589576 | 1.267823 | 1.456553 | 1.424055 | 1.469432 |
| | 2.788767 | 1.949012 | 1.55834 | 1.222458 | 1.37348 | 1.350771 | 1.369036 |
| | 2.755168 | 1.930797 | 1.534045 | 1.184256 | 1.111337 | 1.300804 | 1.285373 |
| | 2.728288 | 1.889813 | 1.502809 | 1.146054 | 1.050416 | 1.229185 | 1.219964 |
| | | 1.867044 | 1.485455 | 1.117403 | 1.006111 | 0.992675 | 1.17585 |
| | | 1.848829 | 1.471573 | 1.086364 | 0.971035 | 0.939377 | 1.111962 |
| | | | 1.440336 | 1.067263 | 0.93596 | 0.899403 | 0.895958 |
| | | | 1.422983 | 1.05055 | 0.908269 | 0.867758 | 0.848803 |
| | | | 1.4091 | 1.029061 | 0.878732 | 0.827784 | 0.812295 |
| | | | | 1.019511 | 0.858425 | 0.812794 | 0.784914 |
| | | | | 1.00996 | 0.834426 | 0.787811 | 0.757533 |
| | | | | 0.988472 | 0.819657 | 0.767824 | 0.737759 |
| | | | | 0.978921 | 0.808581 | 0.749503 | 0.714941 |
| | | | | 0.966983 | 0.791966 | 0.736178 | 0.696687 |
| | | | | | 0.784582 | 0.724519 | 0.679955 |
| | | | | | 0.777197 | 0.71286 | 0.667786 |
| | | | | | 0.762429 | 0.704533 | 0.658659 |
| | | | | | 0.753198 | 0.69787 | 0.648011 |
| | | | | | 0.745814 | 0.684546 | 0.640405 |
| | | | | | | 0.677884 | 0.635841 |
| | | | | | | 0.671221 | 0.623672 |
| | | | | | | | 0.617588 |
| | | | | | | | 0.611503 |

Referring now to Table 2, shown is a corresponding energy map generated based on the energy consumption information from Table 1 above. As shown, for each robustness index, one or more entries are provided having a corresponding modulation configuration (MOD 0-MOD 7) and a corresponding power configuration (in terms of dBm). And as further illustrated in Table 2, the bolded entries correspond to optimal configurations for each robustness level, and those in italics correspond to a configuration to be used for packets of a predetermined type (e.g., retransmissions or acknowledgements). Note that in Tables 1 and 2, as the entries proceed from top to bottom, robustness decreases and in turn throughput increases. Note also that Table 2 is provided for obtaining M, P pairs for packets of at least a threshold length (e.g., 256 bytes). Understand that one or more other tables (not shown) may be present for packets of smaller length (e.g., less than 256 bytes).

TABLE 2

| Mod 0 | Mod 1 | Mod 2 | Mod 3 | Mod 4 | Mod 5 | Mod 6 | Mod 7 |
|---|---|---|---|---|---|---|---|
| *14* | | | | | | | |
| 13 | | | | | | | |
| 12 | | | | | | | |
| 11 | *14* | | | | | | |
| 10 | 13 | | | | | | |
| 9 | 12 | *14* | | | | | |
| 8 | 11 | 13 | | | | | |
| 7 | 10 | 12 | | | | | |
| 6 | 9 | 11 | *14* | | | | |
| 5 | 8 | 10 | 13 | | | | |
| 4 | 7 | 9 | 12 | | | | |
| 3 | 6 | 8 | 11 | | | | |
| 2 | 5 | 7 | 10 | | | | |
| 1 | 4 | 6 | 9 | *13* | | | |
| 0 | 3 | 5 | 8 | 12 | | | |
| −1 | 2 | 4 | 7 | 11 | | | |

TABLE 2-continued

| Mod 0 | Mod 1 | Mod 2 | Mod 3 | Mod 4 | Mod 5 | Mod 6 | Mod 7 |
|---|---|---|---|---|---|---|---|
| -2 | 1 | 3 | 6 | 10 | | | |
| -3 | 0 | 2 | 5 | 9 | | | |
| -4 | -1 | 1 | 4 | 8 | 12 | | |
| -5 | -2 | 0 | 3 | 7 | 11 | | |
| -6 | -3 | -1 | 2 | 6 | 10 | 11 | |
| -7 | -4 | -2 | 1 | 5 | 9 | 10 | |
| -8 | -5 | -3 | 0 | 4 | 8 | 9 | 10 |
| -9 | -6 | -4 | -1 | 3 | 7 | 8 | 9 |
| -10 | -7 | -5 | -2 | 2 | 6 | 7 | 8 |
| -11 | -8 | -6 | -3 | 1 | 5 | 6 | 7 |
| | -9 | -7 | -4 | 0 | 4 | 5 | 6 |
| | -10 | -8 | -5 | -1 | 3 | 4 | 5 |
| | -11 | -9 | -6 | -2 | 2 | 3 | 4 |
| | | -10 | -7 | -3 | 1 | 2 | 3 |
| | | -11 | -8 | -4 | 0 | 1 | 2 |
| | | | -9 | -5 | -1 | 0 | 1 |
| | | | -10 | -6 | -2 | -1 | 0 |
| | | | -11 | -7 | -3 | -2 | -1 |
| | | | | -8 | -4 | -3 | -2 |
| | | | | -9 | -5 | -4 | -3 |
| | | | | -10 | -6 | -5 | -4 |
| | | | | -11 | -7 | -6 | -5 |
| | | | | -12 | -8 | -7 | -6 |
| | | | | | -9 | -8 | -7 |
| | | | | | -10 | -9 | -8 |
| | | | | | -11 | -10 | -9 |
| | | | | | -12 | -11 | -10 |
| | | | | | -13 | -12 | -11 |
| | | | | | | -13 | -12 |
| | | | | | | -14 | -13 |
| | | | | | | | -14 |
| | | | | | | | -15 |

In a given wireless transceiver, one or more tables including entries such as shown in Table 2 may be included (as stored in a lookup table or other non-volatile storage, such as lookup table 135 of FIG. 1), where each table can be associated with packets of a particular length or range of lengths. Packet or frame size may be considered because differently sized packets have different considerations. Transmissions include a fixed-length preamble: for short packets such a preamble weighs a lot in the overall consumption, whereas it has a minor influence in long packets. For short packets, the cost of transmitting the preamble may be reduced by choosing a lower modulation and transmit power pair. The packet length is therefore an entry of the rate adaptation block.

Thus in method 300, a designated RF chain is configured to transmit dummy data with expected modulation and power, and consumption is measured during this operation. The estimation of robustness in the final energy map comes from the fact that each modulation has a reference sensitivity. That is, transmitting a packet using modulation and power pair ($M_k$, $P_i$) has an equal chance of success as transmitting the packet with modulation and power pair ($M_{k+1}$, $P_i$+a few dBm). Table 2 is filled following these assumptions, forming the different robustness levels. The goal of actual chip measurements of Table 1 is to associate a consumption to each of these couples, and ultimately select the best one per row. Note that the whole operation of method 300 may be reiterated for different categories of packet size (two or more or just one). In such case the information in Tables 1 and 2 is duplicated for each chosen category of packet length, and the highlighted entries (Mopt, Popt) would differ.

In embodiments firmware may include these tables, and a separate list of an optimal couple for each robustness index. Such tables may then be stored into a given chip, e.g., in a non-volatile storage. Then during operation, packet size of a packet to be sent may be used to identify the appropriate table for access. In turn, a corresponding robustness index, e.g., as determined by a dynamic adaptation circuit, may be used to access a given row of an identified table to obtain a corresponding modulation and target power (e.g., an optimal pair) for the given robustness index. Optionally, rows can be deleted in the tables to decrease code complexity. Note that the firmware implements the full tables and not only optimal couples because if (for various exceptional Wi-Fi related reasons) a certain rate or power is forbidden, a next available couple may be used, so that the same robustness level may be targeted or, in last resort, lower the index and reiterating the process.

Embodiments may use an algorithm to determine an appropriate robustness level. According to the algorithm, as long as transmissions succeed, it may be assumed that the link is good and robustness can be decreased, until a robustness level is reached where the link is exactly strong enough. On the opposite, if the transmission conditions deteriorate the transmitter will fall back to a stronger robustness level. Once the robustness level is selected, the energy-per-bit map is used to determine which ($M_{opt}$, $P_{opt}$) couple to use.

Figure 4A:
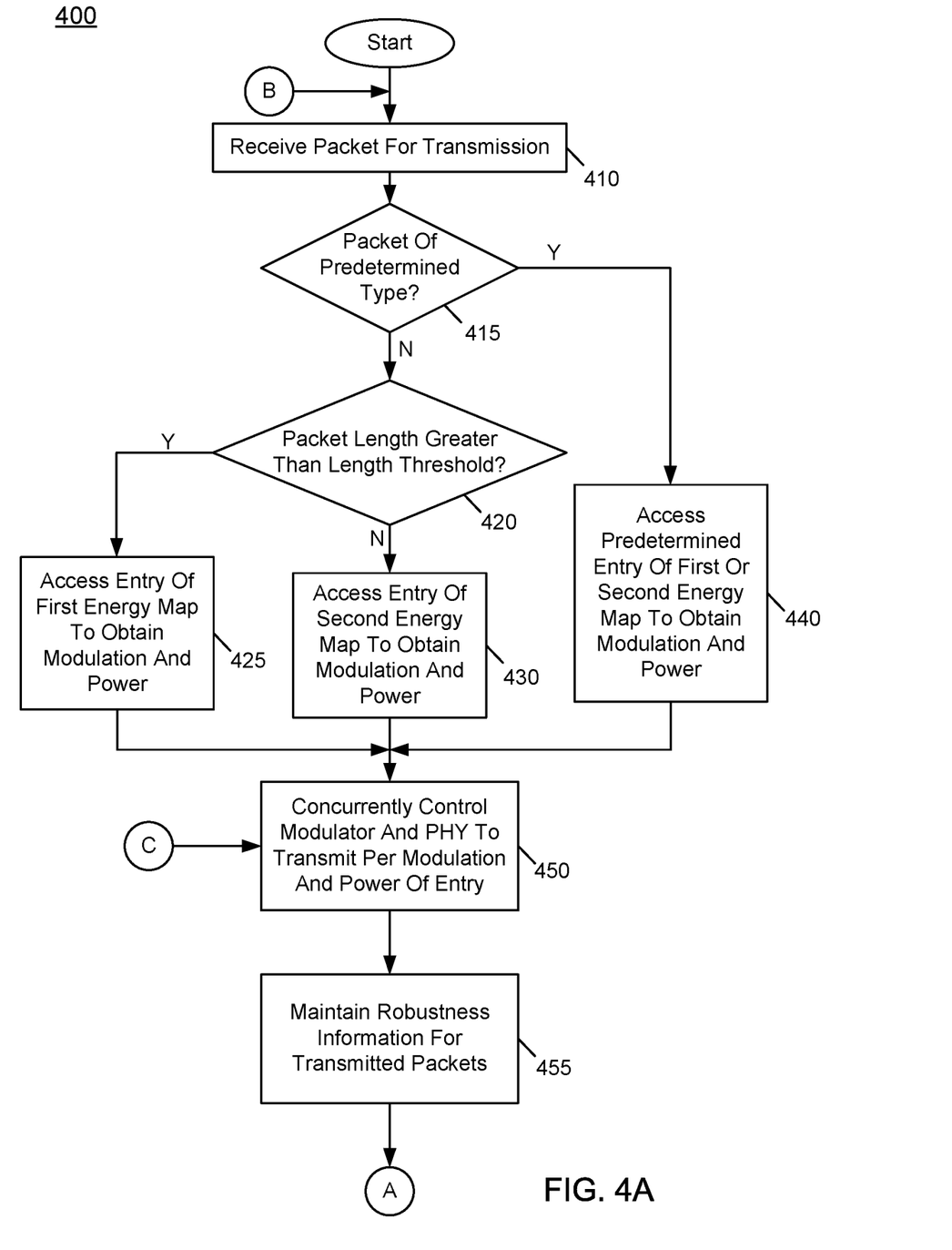
FIGS. 4A and 4B are flow diagrams of a method in accordance with another embodiment.
Figure 4B:
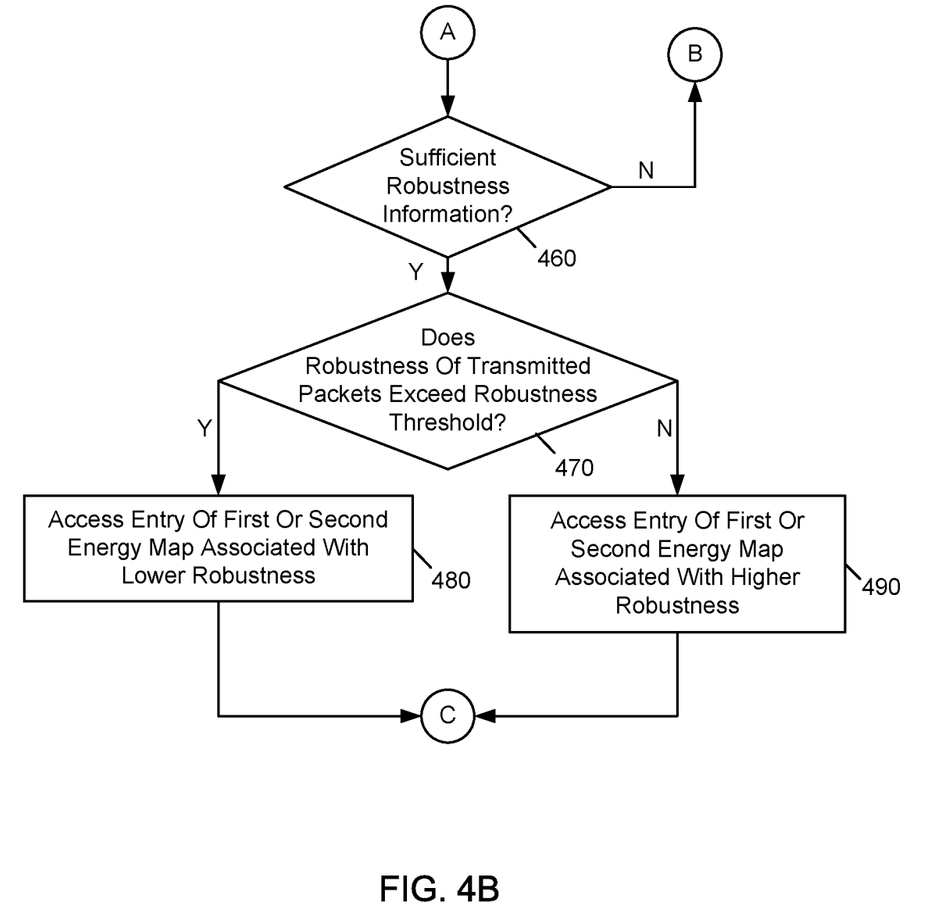

Referring now to FIGS. 4A-4B, shown is a flow diagram of a method in accordance with another embodiment. More specifically, method 400 in FIG. 4 is a method for dynamically performing rate and power adaptation in a wireless transmitter in accordance with an embodiment. As such, method 400 may be performed by hardware circuitry, firmware, software and/or combinations thereof. In a particular embodiment, method 400 may be performed by an adaptation circuit such as adaptation circuit 130 of FIG. 1.

As seen, method 400 begins by receiving a packet for transmission (block 410). Next it is determined whether the packet is of a predetermined type (diamond 415). Although embodiments may vary, such predetermined packet types may include a retransmission packets and acknowledgement packets. If one of these packet types is present, control passes to block 440 where a predetermined entry of an energy map can be accessed to obtain modulation and power parameters. Such parameter may correspond to a given value (e.g., of higher power) for a given robustness index (e.g., corresponding to a robustness level at which the transmitter is currently operating). Note that in other cases, instead of accessing predetermined entries for these predetermined packet types, such packets may be transmitted with control parameters obtained in other manners. For example, retransmission frames may be transmitted using a latest modulation and a hard-coded maximum power level. In turn, acknowledgments and other management frames may be transmitted with hard-coded values for both modulation and power, e.g., a most robust modulation parameter and a maximum power level. As such, in some cases these predetermined packet types may be controlled to be sent without access to information in any of one or more present energy maps. Note that lowering data rate increases on air duration and the risk for a frame to be jammed by a RF noise source and therefore not received. This triggers a retransmission, hurting power consumption and throughput. Thus in a particular embodiment, a predetermined pair ($M_{opt}$, $P_{max}$) of a given robustness index may be used for retransmission frames to avoid entering a retransmission loop, which would adversely impact power consumption. This is so, as the impact on power consumption is limited. Note in embodiments, acknowledgement (ACK) packets may always use the highest robustness available, as they are absolutely vital to the network's life and cannot afford a risk of loss. Unlike other management packets, ACKs are not retransmitted. A set of these predetermined pairs for each robustness index also may be stored in a non-volatile memory.

Still with reference to FIG. 4A, if the packet is not of such a predetermined type, control passes to block 420 to determine whether the packet length exceeds a given length threshold. As an example, this length threshold may be of 256 bytes. If it is determined that the packet length is greater than this length threshold, control passes to block 425 where an entry of a first energy map may be accessed to obtain modulation and power characteristics. For example, an entry for a current robustness level may be accessed and the optimal modulation and power pair is identified. Note instead if the packet length is not greater than this length threshold, control passes to block 430 where an entry of a second energy map may be accessed. Understand although shown in the embodiment of FIG. 4A with two such energy maps and a single length threshold, in other cases multiple length thresholds and additional energy maps may be possible.

Still with reference to FIG. 4A, control passes to block 450 where the modulator and PHY can be concurrently controlled to transmit the packet per the modulation and power characteristics for the given entry. Next at block 455 robustness information may be maintained for transmitted packets. As discussed above, this robustness information may correspond to feedback information received from a receiver, e.g., in the form of acknowledgements, which may be maintained as a count of successful packets.

Control next passes to FIG. 4B, where it is determined whether sufficient robustness information has been received (diamond 460). For example, the transmitter may send a representative number of packets, e.g., on the order of between approximately 1 and a few dozen before sufficient robustness information exists. When it is determined that sufficient robustness information is present, it is determined whether the robustness of the transmitted packets exceeds a given robustness threshold (block 470). As an example, this robustness threshold may correspond to 90% of successful transmits. If the robustness of the transmitted packets exceeds the robustness threshold, control passes to block 480 where an entry of the given energy map can be accessed that is associated with a lower robustness level (e.g., one lower index). Thereafter, the packet may be transmitted using the obtained modulation and power pair (at block 450). Instead if it is determined that the robustness of transmitted packets does not exceed the robustness threshold, control passes to block 490 where an entry of the given energy map can be accessed that is associated with a higher robustness level (e.g., one higher index). In some embodiments, it is possible for control to pass directly to block 490 in response to one unreceived ACK message, if a ruling algorithm decides that failure is not an option. Understand while shown at this high level in the embodiment of FIGS. 4A and 4B, many variations and alternatives are possible.

Figure 5:
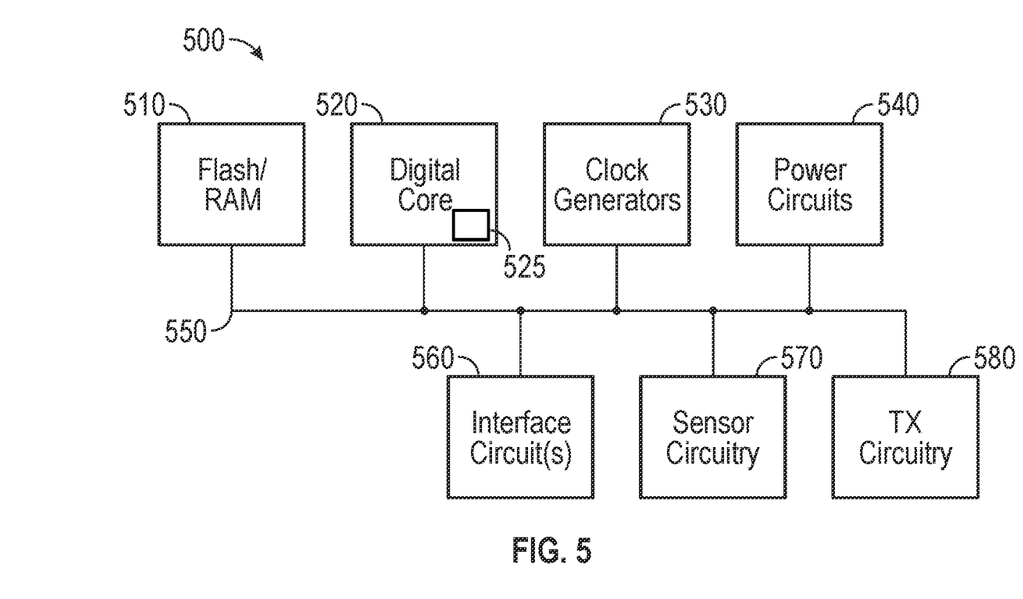
FIG. 5 is a block diagram of a representative integrated circuit in accordance with an embodiment.

Referring now to FIG. 5, shown is a block diagram of a representative integrated circuit 500 which may include control circuitry to dynamically adapt modulation and power characteristics of packet transmissions to optimize power consumption while maintaining an acceptable level of robustness as described herein. In the embodiment shown in FIG. 5, integrated circuit 500 may be, e.g., a microcontroller, wireless transceiver or other device that can be used for a variety of use cases, including sensing, monitoring, embedded applications, communications, applications and so forth, and which may be particularly adapted for use in an IoT device.

In the embodiment shown, integrated circuit 500 includes a memory system 510 which in an embodiment may include a non-volatile memory such as a flash memory and volatile storage, such as RAM. In an embodiment, this non-volatile memory may be implemented as a non-transitory storage medium that can store instructions and data. Relevant herein, such non-volatile storage may store one or more energy maps and corresponding information regarding optimal modulation and power pairs for given robustness levels, and appropriate modulation and power characteristics for transmission of particular packet types such as retransmissions, acknowledgements, or other management packets. Furthermore, such non-volatile memory may store instructions for execution of the dynamic rate and power operations described herein.

Memory system 510 couples via a bus 550 to a digital core 520, which may include one or more cores and/or microcontrollers that act as a main processing unit of the integrated circuit. As illustrated, digital core 520 may include a control circuit 525 which may be implemented as a dynamic adaptation circuit to determine appropriate modulation and power characteristics for transmission of packets based at least in part on packet length and quality feedback information, as described herein. In turn, digital core 520 may couple to clock generators 530 which may provide one or more phase lock loops or other clock generation circuitry to generate various clocks for use by circuitry of the IC.

As further illustrated, IC 500 further includes power circuitry 540, which may include one or more voltage regulators. Additional circuitry may optionally be present depending on particular implementation to provide various functionality and interaction with external devices. Such circuitry may include interface circuitry 560 which may provide interface with various off-chip devices, sensor circuitry 570 which may include various on-chip sensors including digital and analog sensors to sense desired signals or so forth.

In addition as shown in FIG. 5, transceiver (Tx) circuitry 580 may be provided to enable transmission and receipt of wireless signals, e.g., according to one or more of a local area or wide area wireless communication scheme, such as Zigbee, Bluetooth, IEEE 802.11, cellular communication or so forth. To this end, transceiver circuitry 580 may include a modulator and a physical unit circuit that may include multiple controllable gain stages and a power amplifier, and other circuitry that may be controlled based at least in part on modulation and power characteristics associated with given modulation and power pairs as described herein. Understand while shown with this high level view, many variations and alternatives are possible.

Figure 6:
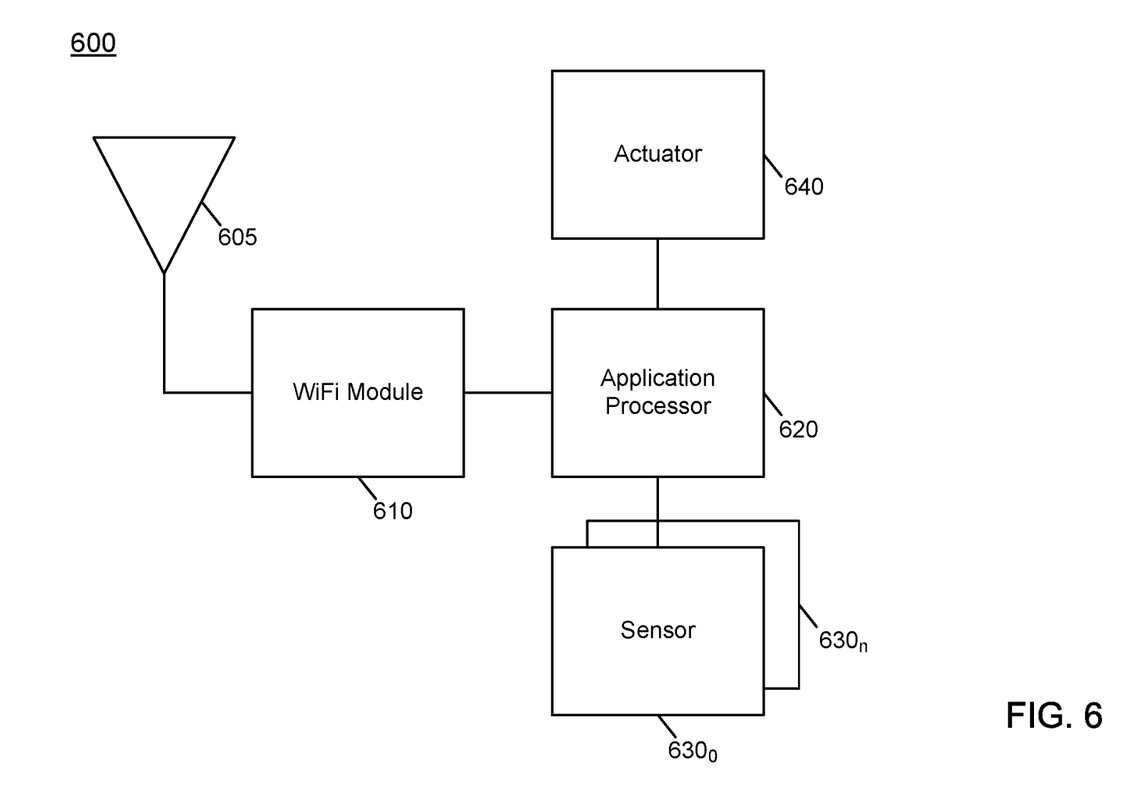
FIG. 6 is a block diagram of an IoT device in accordance with an embodiment.

Referring now to FIG. 6, shown is a block diagram of an IoT device in accordance with an embodiment. As shown in FIG. 6, IoT device may be any type of connected device, and more specifically may be a low power, battery operated device (in many instances) that is enabled to communicate, e.g., in a wireless local area network and/or wide area network (e.g., the Internet). In different cases, IoT device 600 may be a device adapted for use in a variety of different contexts, including home automation systems, commercial and retail systems, security systems, consumer healthcare devices or so forth.

In the high level view shown in FIG. 6, IoT device 600 includes an antenna 605 that couples to a WiFi module 610. WiFi module 610, in various embodiments, may include hardware circuitry to perform the dynamic determination of optimized power and modulation pairs for communication of frames or other packets, as described herein. To this end, WiFi module 610 may include instructions to perform the optimal configuring of modulator and transmitter components as described herein. Such instructions in an embodiment may be provided as firmware stored in a non-volatile storage or other non-transitory storage of WiFi module 610

As illustrated, WiFi module 610 couples to an application processor 620 which may be a main processor of IoT device 600 and which may be implemented, in an embodiment via a microcontroller configured to programmably execute instructions for operation of the device. As further illustrated, application processor 620 couples to one or more sensors $630_0$-$630_n$, which may be used to sense a wide variety of different environmental parameters. In addition, IoT device 610 may optionally include at least one actuator 640 to perform some actuation function under control of application processor 620. Although shown at this high level in the embodiment of FIG. 6, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a modulator to modulate a first packet according to rate control information received from a dynamic adaptation circuit;
    a physical circuit to transmit the modulated first packet according to power control information received from the dynamic adaptation circuit; and
    the dynamic adaptation circuit, for the first packet, to provide the rate control information and the power control information of a first modulation and power pair stored in a first energy map, the first energy map including a plurality of modulation and power pairs, wherein multiple ones of the plurality of modulation and power pairs are associated with each of at least some of a plurality of robustness indices, the first modulation and power pair comprising an optimal modulation and power pair of a first plurality of modulation and power pairs associated with a first robustness index of the plurality of robustness indices, wherein the dynamic adaptation circuit is to select the first robustness index based at least in part on quality feedback information from a receiver in communication with the apparatus and when the quality feedback information is less than a first reliability threshold, the dynamic adaptation circuit is, for another packet, to provide the rate control information and the power control information of a different modulation and power pair stored in the first energy map, the different modulation and power pair associated with a higher robustness index.

2. The apparatus of claim 1, wherein the quality feedback information is based on a count of acknowledgement messages received in the apparatus from the receiver for a plurality of packets.

3. The apparatus of claim 1, wherein the dynamic adaptation circuit is to access the first energy map to obtain the first modulation and power pair when a length of the first packet exceeds a length threshold.

4. The apparatus of claim 3, wherein the dynamic adaptation circuit is, for a second packet, to access a second energy map, and not the first energy map, to obtain a different modulation and power pair when a length of the second packet is less than the length threshold.

5. The apparatus of claim 1, further comprising a non-volatile storage to store the first energy map, the first energy map based at least in part on energy consumption information for the plurality of modulation and power pairs.

6. The apparatus of claim 1, wherein the dynamic adaptation circuit is, for a second packet, to provide the rate control information and the power control information of a second modulation and power pair stored in the first energy map, wherein both the rate control information and the power control information of the modulation and power pair and the rate control information and the power control information of the second modulation and power pair differ.

7. The apparatus of claim 1, wherein, in response to a change in a robustness index, the dynamic adaptation circuit is to provide the power control information and the rate control information of a second modulation and power pair stored in the first energy map having different values than corresponding values of a prior robustness index.

8. The apparatus of claim 1, wherein the dynamic adaptation circuit is, for a second packet of a predetermined type, to provide the rate control information having a first predetermined value and the power control information having a second predetermined value.

9. The apparatus of claim 1, wherein the physical circuit is to control a first gain of a first gain block and a second gain of a second gain block based at least in part on the power control information.

10. At least one non-transitory computer readable storage medium comprising instructions that when executed enable a wireless transmitter to perform a method comprising:
    in response to determining that quality feedback information received from a receiver in communication with the wireless transmitter exceeds a robustness threshold, concurrently updating a rate configuration for a modulator of the wireless transmitter and a power configuration for a physical circuit of the wireless transmitter;
    causing one or more packets to be transmitted from the wireless transmitter according to the updated rate configuration and the updated power configuration;
    after causing the one or more packets to be transmitted from the wireless transmitter according to the updated rate configuration and the updated power configuration, determining whether the quality feedback information exceeds the robustness threshold; and
    in response to determining that the quality feedback information exceeds the robustness threshold, concurrently updating the updated rate configuration for the modulator to a second updated rate configuration and updating the updated power configuration for the physical circuit to a second updated power configuration, wherein the second updated rate configuration and the second updated power configuration are associated with a lower robustness level than a robustness level associated with the updated rate configuration and the updated power configuration.

11. The at least one non-transitory computer readable storage medium of claim 10, wherein the method further comprises identifying the updated rate configuration and the updated power configuration based at least in part on a length of the one or more packets.

12. The at least one non-transitory computer readable storage medium of claim 10, wherein the method further comprises accessing a non-volatile storage of the wireless transmitter to obtain the updated rate configuration and the updated power configuration.

13. An internet of things (IoT) device comprising:
a sensor to sense information of an environmental parameter; and
a wireless transceiver coupled to the sensor, the wireless transceiver comprising:
a modulator to modulate a first packet according to a modulation characteristic of a first modulation and power pair;
at least one gain stage coupled to the modulator to apply gain to the modulated first packet according to a power characteristic of the first modulation and power pair;
a power amplifier coupled to the at least one gain stage to receive the gained modulated first packet and amplify and transmit the amplified gained modulated first packet according to the power characteristic of the first modulation and power pair; and
a dynamic adaptation circuit, for the first packet, to identify the first modulation and power pair from a first plurality of modulation and power pairs stored in a first energy map and associated with a first robustness index, wherein the first modulation and power pair comprises an optimal modulation and power pair of the first plurality of modulation and power pairs, and the dynamic adaptation circuit is to select the first robustness index based at least in part on quality feedback information from a receiver in communication with the IoT device, and when the quality feedback information is less than a first reliability threshold, for another packet, identify a different modulation and power pair stored in the first energy map, the different modulation and power pair associated with a higher robustness index than the first robustness index.

14. The IoT device of claim 13, wherein the optimal modulation and power pair comprises a least power consumption level of the first plurality of modulation and power pairs.

15. The IoT device of claim 14, wherein the dynamic adaptation circuit, for a second packet comprising a retransmission packet, is to identify a second modulation and power pair having a highest power consumption level of the first plurality of modulation and power pairs.

* * * * *